May 4, 1965　　　　　H. KUMPF　　　　　3,182,001
HETEROGENEOUS NUCLEAR REACTOR
Filed July 20, 1960　　　　　　　　　　　　2 Sheets-Sheet 1

United States Patent Office 3,182,001
Patented May 4, 1965

3,182,001
HETEROGENEOUS NUCLEAR REACTOR
Hermann Kumpf, Erlangen, Germany, assignor to Siemens-Schuckertwerke Aktiengesellschaft, Erlangen, Germany, a corporation of Germany
Filed July 20, 1960, Ser. No. 44,074
Claims priority, application Germany, July 23, 1959, S 64,057
2 Claims. (Cl. 176—50)

My invention relates to nuclear reactors of the heterogeneous type.

In the construction of nuclear reactors for power generation it is desirable to make the reactor inherently safe by giving it such an operating characteristic that temperature increases, particularly such abrupt increases as may be due to positive reactivity excursions, will cause a reduction of the critical factor below the unity value thus preventing the generation of power surges detrimental to the reactor. Such self-protective behavior is characterized by the negative temperature coefficient which in liquid-cooled reactors essential determines the effect of density variations upon the critical factor. However, for obtaining small critical dimensions of the reactor, a largest feasible density of the moderator is generally desired. Therefore, the moderator is kept at a lowest feasible temperature level independently of the coolant. Under such conditions, the effect of a self-stabilization on account of the negative temperature coefficient of the moderator cannot be appreciably utilized because, generally, the volume of the moderator in most reactors is much larger than the volume which is available in the coolant channels of the core zone and hence can directly react upon temperature changes.

Relating to a heterogeneous nuclear reactor in which the fuel elements are contained in cooling channels that extend in a grid-like arrangement through the moderator space and are traversed by a coolant which possesses moderator properties, it is an object of my invention to improve the design and operation toward self-stabilizing operation by more effectively utilizing the negative temperature coefficient of the moderating coolant; and it is another, subsidiary object to attain such improvement with the aid of particularly simple and reliable devices.

To this end, and in accordance with a feature of my invention, a portion of the moderator space, preferably in the central grid or core zone, is separated from the rest of the moderator space by a partitioning wall structure, and the partitioned-off portion of the moderator space is connected into the coolant circulation system at a hot location of that system so that said portion is traversed by the coolant when the latter is in heated condition. At a result, the volumetric proportion of temperature-dependent coolant in the grid zone is increased, and the effect of density variation due to reactivity excursions is intensified thus achieving self-stabilization of the reactor.

Figure 3:
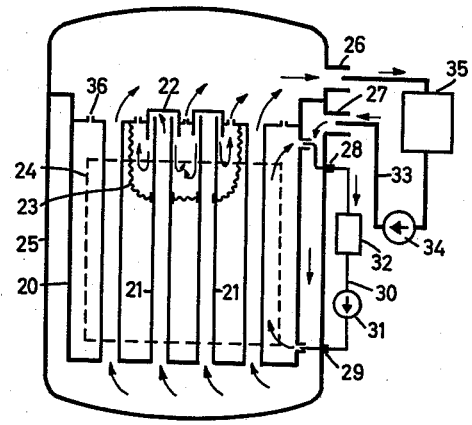
Figure 4:
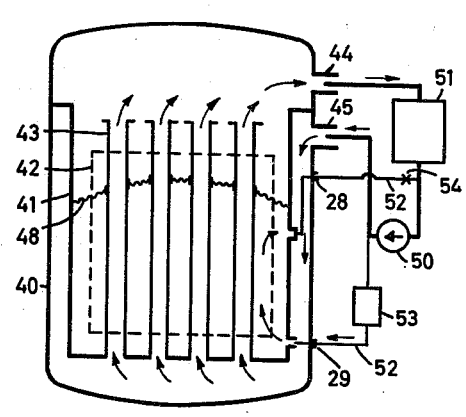
Figure 5:
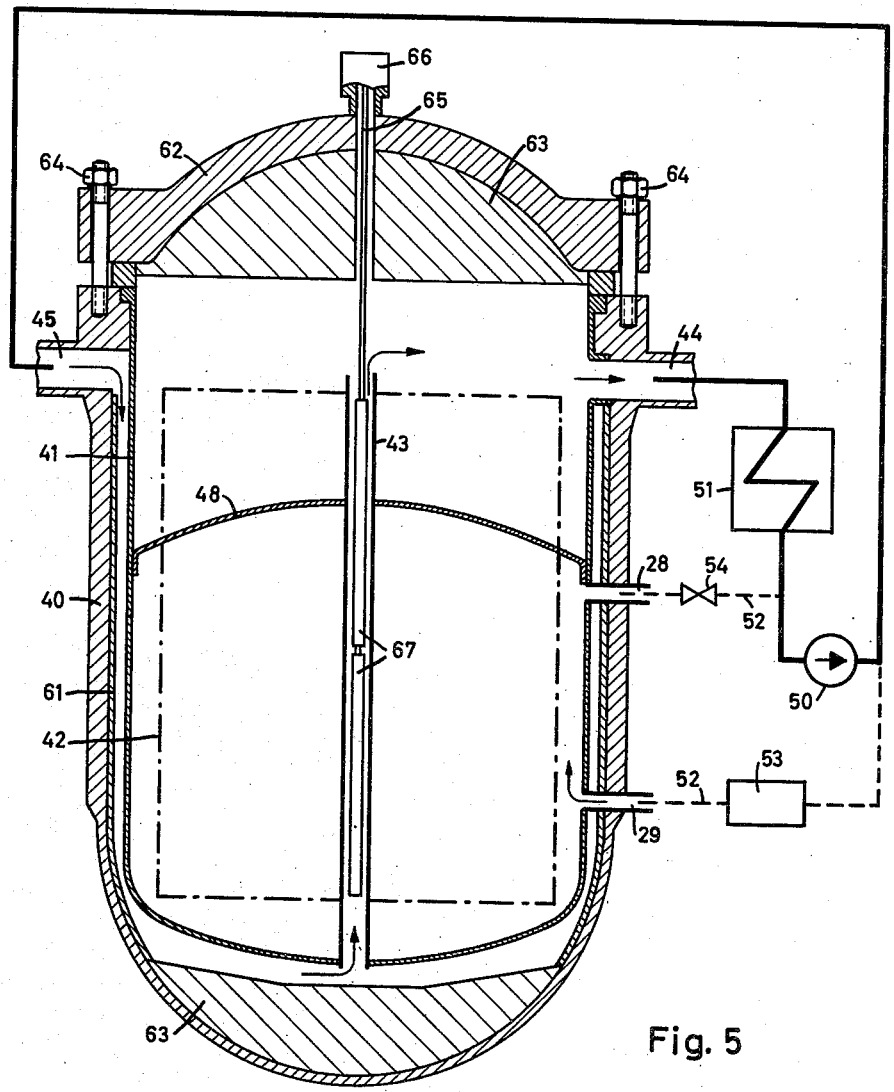

The foregoing and more specific objects, advantages and features of my invention, said features being set forth with particularity in the claims annexed hereto, will be apparent from, and will be described in, the following with reference to the embodiments of nuclear heterogeneous reactors according to the invention illustrated by way of example in the accompanying drawings in which FIGS. 1 through 4 show schematically four different reactor designs in vertical section, and FIG. 5 is a vertical sectional view of reactor details corresponding to the embodiment of FIG. 4.

Figure 1:
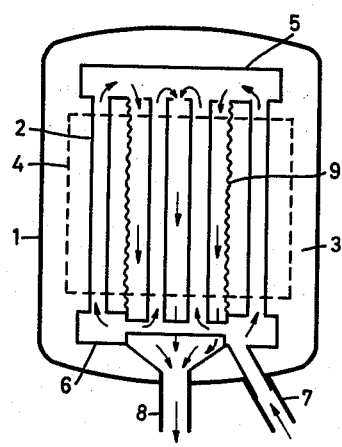

In the reactor according to FIG. 1, the coolant does not enter into contact with the wall of the reactor tank, and the center zone of the moderator space is partitioned-off and traversed by hot coolant according to the invention. The reactor tank 1 of steel comprises a core structure or zone 4 traversed by vertical cooling channels 2 which conjointly form a grid arrangement in the moderator space and core structure 4. The coolant channels 2 communicate at the top with a collector 5 and at the bottom with another collector 6. The lower collector 6 is connected with the coolant inlet conduit 7 of the reactor. The middle portion of collector 6 is subdivided so that the entering cold coolant is separated from the hot coolant which leaves the reactor through a coolant outlet duct 8 without being mixed with the entering quantity. As known and conventional, the fuel elements such as uranium rods are accommodated in the coolant channels 2 so as to be cooled by coolant passing between the fuel elements and the tubular walls of the channels. The fuel elements (67 in FIG. 5) are not illustrated in FIG. 1.

According to the invention, the central portion of the moderator space is separated from the remaining moderator space by a generally cylindrical partition 9 which may consist of steel but if desired, may also be made of heat-insulating material.

For distinction from other structural components, the partition 9 (in FIGS. 1 to 4) is shown by a wavy line, although in practice the partitioning wall is preferably flat as is apparent from the more detailed showing in FIG. 5 described hereinafter.

The central region located within the cylindrical partition 9 according to FIG. 1 is inserted into the coolant circulation path as indicated by the arrows denoting the flow direction of the coolant in respectively different portions of the reactor structure. Consequently, the central moderator space within the partition 9 is supplied with coolant (such as light water) while the latter has already reached heated condition while passing upwardly through the fuel-coolant channels 2. As a result, the hot-water volume in the effective core zone of the moderator space, enclosed by partition 9 is considerably increased at the expense of the moderator volume thus obtaining the desired increase in negative temperature coefficient.

Figure 2:
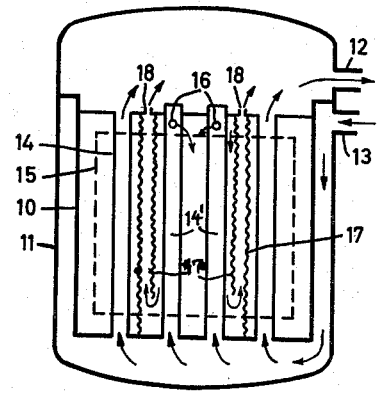

The modified reactor according to FIG. 2 has a separate moderator tank 10 built into the outer reactor tank 11. The main tank 11 is provided with an inlet duct 13 and outlet duct 12 for moderator-coolant. The cooling channels 14, which during operation comprise the fuel elements (not illustrated) pass vertically through the moderator tank and, in totality, form a grid structure passing through the core zone 15. This core zone defines the moderator space. The main tank 11 is closed on all sides with the exception of the openings in the top portion.

A particularity, in comparison with the reactor of FIG. 1, is the fact that a portion of the cooling channels, in the illustrated embodiment the centrally located channels, are closed at the exit ends and are provided with lateral outlet openings 16 closely beneath the top cover of the moderator tank 10. In accordance with another feature of the invention, these particular channels are separated from the other moderator space by a cylindrical outer partitioning wall 17 and a downwardly shorter, inner cylindrical wall 17', so that a flow reversal within the partitioned-off space is obtained, the hot coolant leaving the central moderator space through openings 18 in the top cover of the moderator tank.

In comparison with the embodiments so far described, only the upper central portion in the moderator space of the reactor shown in FIG. 3 is partitioned-off and supplied with hot coolant. For this purpose, a central portion of the top cover on the moderator tank 20 is perforated, and the centrally located cooling channels 21 are provided with cup-shaped guides 22. The central, upper portion of the moderator space is separated toward the sides and toward the bottom from the other, major portion of the moderator space by a partitioning wall structure 23. In other respects, the reactor according to FIG. 3 is similar to those described above with reference to FIGS. 1 and 2, the core zone being identified by a broken contour line 24, the outer reactor tank being shown at 25. This core zone defines the moderator space. The inlet and outlet ducts 27 and 26 for coolant communicate with the reactor tank. However, this reactor is additionally provided with sealed inlet and outlet ducts 28, 29 for the moderator.

The moderator circulatory system comprises a pipe-line 30 with an impeller pump 31 and a heat-exchanging cooler 32. This moderator circulatory system is completely separated from the coolant circulation system comprising a pipeline 33 with another impeller pump 34 and a heat exchanger 35. Communicating holes in the moderator tank take care of providing for the necessary pressure equalization between the two circulation systems. Corresponding circulatory systems are also applied to the reactors shown in FIGS. 1 and 2 where the systems are not illustrated.

While in the embodiments described above, the partitioned-off moderator space is more or less limited to the central grid zone, the reactor according to FIG. 4 exemplifies a design in which the partitioning means divide the reactor space into an upper and a lower zone. The moderator tank 41, inserted into the outer reactor tank 40, is open. Its cooling channels 43 form a grid-like arrangement traversing the core zone 42 of the reactor. This core zone defines the moderator space. The cooling channels communicate with coolant inlet and outlet conduits 45 and 44. The separating partition 48 in this reactor constitutes a second bottom structure located above the bottom proper of the moderator tank. The partition preferably consists of a material having a small neutron absorption cross section.

The coolant circulation path in the reactor of FIG. 4 is similar to the one described above with reference to FIG. 3. It comprises a circulatory pipeline with an impeller pump 50 and a heat exchanger. The pump 50 is also used as an impeller for the moderator. The moderator circulation line 52 is connected with the coolant circulation path at respective branch locations ahead of the pump 50 and behind the pump. Located in the last portion of the moderator circulation path is a cooler 53. A throttle, such as a throttle valve 54, is connected into the first portion of the moderator circulation path, the throttle resistance being approximately equal to that of the heat exchanger 51.

While in the reactor of FIG. 4, the coolant and the moderator consist of the same medium, such as light or heavy water, both may be constituted by different media in such reactors as shown in FIG. 3 where the two circulatory systems are separate from each other. To permit the use of thin partitioning walls, the pressures of both media are preferably kept substantially equal, a more accurate pressure equalization being obtainable with the aid of conventional pressure equalizing means.

Details of the reactor described above with reference to FIG. 4, as well as reactor components applicable in the reactors according to FIGS. 1, 2 and 3, are illustrated in FIG. 5 in which the individual components are denoted by the same reference numerals as in FIG. 4 with the exception of additional components described presently.

The outer tank 40 of the reactor is topped by a cover 62 whose flange is fastened and tightened against a corresponding flange of tank 40 by means of peripherally distributed screw bolts 64. Disposed in the enclosed and sealed tank space are two filler bodies 60 and 63 which serve to reduce the volume of the tank but are used only when heavy water is employed as coolant and moderator.

The filler bodies 60, 63 consist, for example, of concrete or a hollow structure of steel. The upper filler body 63 is traversed by a grid-like arrangement of vertical bores or tubes for inserting nuclear fuel elements into the core zone or for removing the spent elements therefrom. The reactor is provided with a thermal shield 61 of steel. The moderator tank 41 and the partitioning bottom 48 may consist of aluminum, zirconium or stainless steel. Only one of the coolant channels 43 for accommodating the fuel elements is illustrated in FIG. 5, the others being arranged as explained above with reference to FIG. 4. The illustrated channel 43, consisting of a tube, is shown provided with an inserted nuclear fuel rod 67. The rod is suspended from a carrier rod 65 which is connected with a closure structure 66 so spaced from the fuel element as to secure a proper location of the element within the core zone 42 when the closure 66 is tightly placed upon the cover 62, then sealing the interior of the tank from the outside.

In all other respects the reactor shown in FIG. 5 corresponds to the one according to FIG. 4.

It will be understood from FIG. 5 that corresponding provision for insertion and removal of the fuel elements is to be made in reactors as described with reference to FIGS. 1, 2 and 3. For example, in all these reactors the fuel elements are rod-shaped and may be lowered through corresponding openings of the tank cover into the coolant channels. The collector spaces 5 and 6 according to FIG. 1 are preferably also provided with openings registering with those of the channels in order to permit the insertion or withdrawal of fuel elements, these openings being closed and sealed by respective carrier devices in the same manner as shown in FIG. 5. In the embodiment of FIG. 2, the channels denoted by 16 may likewise be provided with rod-shaped fuel elements suspended from carrier structures, as shown in FIG. 5, which in this case (FIG. 2) simultaneously serve to close the upper ends of the cooling channels 16. In all illustrated embodiments, the moderator and the coolant consist preferably of the same substance, for example, either heavy water or light water.

As far as other design features and auxiliaries, not essential to the present invention, are concerned, the above-described reactors according to the invention may be given a construction essentially similar to known reactor plants such as the one at Shippingport, Pennsylvania, described in various publications, for example in the Geneva Reports, 1955, vol. 3, or in "Atomic Energy Facts," U.S. Government Printing Office (page 92).

All illustrated reactors are particularly effective for boiling-water reactors or with reactors in which at least surface boiling occurs.

I claim:

1. A heterogeneous nuclear reactor comprising a reactor tank having a grid structure of parallel coolant channels for receiving nuclear fuel elements, a moderator space surrounding said channels and defined by the fuel-bearing portions of said channels, conduit means for moderator-type coolant defining together with said channels a circulatory coolant path through said channel, a coolant-impermeable partitioning wall structure dividing a portion of the moderator space from the rest of the space, said portion communicating with the hot region of said coolant path, said partitioning wall structure extending transversely to the axis of the respective channels across said moderator space at a location between the respective ends of the fuel-bearing portions of said channels and closer to the ends of said channels extending into the portion of said moderator space which communicates with the hot region of said coolant path whereby the greater length of said channels is in said rest of said moderator space.

2. In a nuclear reactor according to claim 1, said partitioning wall structure consisting of a material having a small neutron absorption cross section.

(References on following page)

References Cited by the Examiner

UNITED STATES PATENTS

| | | | |
|---|---|---|---|
| 2,832,733 | 4/58 | Szilard | 176—52 |
| 2,848,404 | 8/58 | Treshow | 176—44 |
| 2,868,708 | 1/59 | Vernon | 176—43 |
| 2,898,280 | 8/59 | Schultz | 176—78 |
| 2,938,845 | 5/60 | Treshow | 176—54 |
| 2,999,059 | 9/61 | Treshow | 176—42 |
| 3,034,977 | 5/62 | Holl et al. | 176—54 |
| 3,058,898 | 10/62 | Pratt | 176—55 |
| 3,085,959 | 4/63 | Germer | 176—59 |

FOREIGN PATENTS

| | | |
|---|---|---|
| 219,722 | 1/59 | Australia. |
| 222,392 | 6/59 | Australia. |
| 546,078 | 9/57 | Canada. |
| 1,162,270 | 4/58 | France. |
| 1,187,404 | 3/59 | France. |
| 1,039,659 | 9/50 | German printed application. |
| 1,048,363 | 1/59 | German printed application. |

CARL D. QUARFORTH, *Primary Examiner.*

LEON D. ROSDOL, ROGER L. CAMPBELL,
*Examiners.*